Patented May 17, 1927.

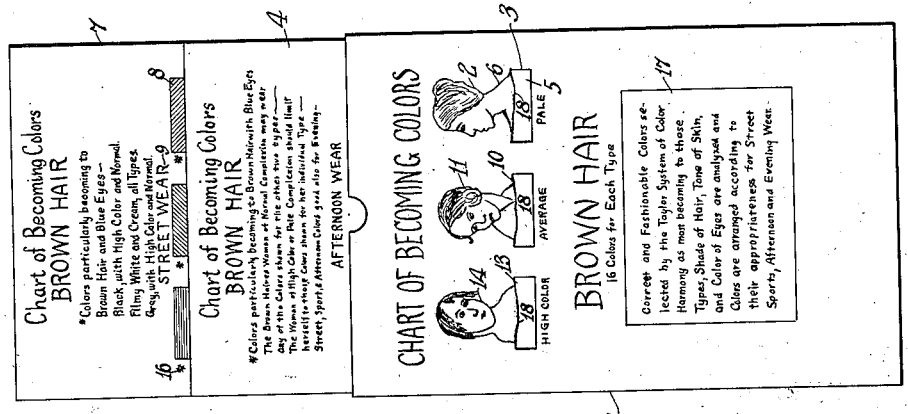

1,629,330

UNITED STATES PATENT OFFICE.

HAZEL H. ADLER, OF NEW YORK, N. Y.

COLOR-HARMONY DEVICE.

Application filed July 12, 1924. Serial No. 725,596.

This invention relates to color harmony devices for assistance or guidance in the selection of harmonious colors and is herein illustrated as applied to devices for assistance or guidance in the selection of harmonious colors for ladies' apparel.

Such devices should be easy to manipulate and strong and simple and convenient and easily understood. It has been found possible to obtain all these and other advantageous objects in a device which is inexpensive and durable. A device in the form herein illustrated depicts in their natural colors three typical complexions of one general type of hair color, there being preferably separate devices of blondes, for brunettes, and for women whose hair is brown, is auburn, and is gray or white. Each of these devices is in the form of an envelope-casing forming a mask and containing a color-bearing slide shiftable to bring any one of the harmonizing colors which it bears beneath an opening adjacent the corresponding complexion depicted on the envelope. As a result the prospective purchaser of goods, after selecting the appropriate hair and complexion for a standard of comparison, by shifting the slide, sees the colors which harmonize with that hair and complexion juxtaposed to a representation of a head and neck of the selected type of hair and complexion.

Moreover the envelope-casing keeps the color slide clean, is easy to handle, removes temptation to rest the finger on other colors, reduces the likelihood of soiling the color slides, and, by having openings to display only a few colors at a time, isolates the color viewed from other colors which would tend to impress the eye with their complementary hues.

Other features and advantages will hereinafter appear.

In the accompanying drawings:

Figure 1 shows an envelope chart device for displaying harmonizing colors for brown hair.

Figure 2 is a sectional side view of the envelope and its contents.

Figure 3 is a front view of one of the slides.

For a prospective purchaser who has brown hair with pale complexion or is purchasing for another having that hair and complexion, the sales clerk at a store counter, who usually has a set of envelope charts for each of blondes, brunettes, auburn, brown and gray or white haired ladies, shows to the prospective purchaser the envelope chart 1 marked Brown hair, and calls attention to the illustration 2 labelled "Pale" and indicates the opening 3 in the mask thereunder. If the prospective purchaser is seeking an evening gown, the clerk pulls out the slide 4 to expose at the opening one of the color areas 5 in the corresponding column on the slide beneath the caption "Evening wear." This positions the color area 5 beneath the head and immediately beneath the neck of the pictured head and neck of a brown haired figure 2 of pale complexion and in about the position of the upper part of a gown, thus lending verisimilitude to the exhibited harmony of colors. The prospective purchaser or clerk then easily adjusts the slide to expose the various other color areas under this heading. Similarly, if the prospective purchaser desires an afternoon gown, the slide is shifted to expose one of the color areas in the corresponding column under "Afternoon wear." The body of the envelope is preferably dead black to do away with the complementary and other effects of adjacent colors. For similar reasons the lettering on the face of the envelope is preferably white or brown.

It is found desirable to have each envelope contain also a second slide 7, bearing corresponding sets of color areas 8. One of these sets of color areas is shown as labelled at 9, "Street wear," to facilitate the selection of harmonizing colors for street costumes, and the other set of areas (not shown) is labelled "Sports" for a corresponding purpose.

In addition to the opening 3 at the legend "Pale" there is an opening 10 at the legend "Average" at the center of the envelope under a pictured head and neck of a brown-haired figure 11 of average complexion, registering with any color area of a corresponding column of color areas 12 on the slides 4 and 7. There is also an opening 13 at a legend "High color" near the opposite edge of the envelope under a pictured head and neck of a brown-haired figure 14 of high or vivid complexion, registering with any of a corresponding third color area 15 of a column of color areas on the slide, thus facilitating the selection of harmonizing colors for these related types of coloring.

Each slide is shown as bearing a legend at its top identifying the envelope with which it is to be used, and also bearing any desired simple directions, such as "The brown-haired woman of average complexion may wear * * *," "The colors suggested for sport and * * *".

An indicating symbol such as an asterisk 16 may be placed adjacent any of the color areas, referring to a legend printed elsewhere, as shown on the slide 4, with the legend "Particularly becoming to brown hair with blue eyes."

The following chart of color areas has been found suitable for the "brown hair" envelope:

*Afternoon.*

| Vivid complexion. | Average. | Pale complexion. |
| --- | --- | --- |
| Light yellow green. Medium blue. Light blue violet. | Light violet red. Brilliant green blue. Medium blue. | Light violet. Light orange. Medium grayed green. |
| Light grayed orange yellow. | Medium red orange. | Light green blue. |

*Evening.*

| Vivid complexion. | Average. | Pale complexion. |
| --- | --- | --- |
| Medium blue. Medium blue violet. Medium grayed green blue. | Medium violet. Brilliant blue. Brilliant blue green. | Dark violet red. Light grayed green. Light violet red. |
| Brilliant blue violet. | Brilliant violet. | Medium red orange. |

The colors above described are those which will appear upon the card 4 in the order given, and which are represented by variations of line shading, in this example of the slide to be employed in an embodiment of my invention.

The colors which will appear upon the card 7, in the order in which they will appear under their respective captions in the example illustrated are as follows:

*Brown hair.*
STREET WEAR.

| Vivid complexion. | Average complexion | Pale complexion. |
| --- | --- | --- |
| Marine blue. Victoria. Blue gray. Gold brown. | Blue violet dark. Green medium. Tortoiseshell. Brick. | Green blue dark. Violet red dark. New brick. Almond green. |

SPORT WEAR.

| | | |
| --- | --- | --- |
| Cloissonné. Tortoiseshell. Sunflower. Narcissus. | Patricia. Navaho. Emerald green. Chinese red. | Fern. Lacquer mex. Springtime. Blue green medium. |

It is found that a set of five envelope-masks is usually sufficient to meet the demands of exacting trade conditions, there being one envelope for "Brunettes", one for "Blonds", one for "Brown hair", one for "Auburn hair", and one for "Gray hair". The envelope 1 for the "Brunnettes" differs from all the others in having the openings 3, 10 and 13 for women of "olive complexion", "fair complexion", and "dark complexion" respectively instead of "pale", "average" and "high color" as shown.

The colors which will appear on the two cards in each device for the "Brunette" envelope, in the order in which they will appear under their respective headings in the example here disclosed are as follows:

*Brunette.*
STREET.

| Dark complexion. | Fair complexion. | Olive complexion. |
| --- | --- | --- |
| Green gray. Maroon. Gold brown. Violet blue dark. | Violet red dark. Blue gray. Almond green. Blue violet dark. | Brick. Marine blue. Green blue dark. New brick. |

SPORT.

| | | |
| --- | --- | --- |
| Blue green med. Lacquer mex. Green blue med. Emerald. | Chinese red. Jade. Navaho. Narcissus. | Tortoiseshell. Blue green med. Emerald. Lacquer Mex. |

AFTERNOON.

| | | |
| --- | --- | --- |
| Cosmos. Toltec. Crabapple. Blue gray. | Springtime. Turquoise. Lt. blue violet. Powder blue. | Pale turquoise. Crabapple. Springtime. Dryad. |

EVENING.

| | | |
| --- | --- | --- |
| Jade. Chinese red. Fern. Orchid. | Crabapple. Sunflower. Patricia. Fleur de lis. | Turquoise. Navaho. Cloissonné. Violet red dark. |

The colors which will appear on the two cards in each device for the "Blonde" envelope, in the order in which they will appear under their respective headings in the example here disclosed are as follows:

*Blonde.*
STREET.

| Vivid complexion. | Average complexion. | Pale complexion. |
| --- | --- | --- |
| Marine blue. Blue gray. Green blue dark. Brick. | Blue violet dark. Green medium. Tortoiseshell. Gold brown. | Almond green. Blue green med. New brick. Green gray. |

SPORT.

| | | |
| --- | --- | --- |
| Blue violet med. Narcissus. Fleur de lis. Sunflower. | Chinese red. Louis Philippe. Emerald. Daphne. | Lacquer mex. Tortoiseshell. Crabapple. Fern. |

AFTERNOON.

| | | |
| --- | --- | --- |
| Medium violet. Daphne. Lariat. Light blue violet. | Pale turquoise. Cosmos. Powder blue. Orchid. | Green medium. Orchid. Toltec. Pale turquoise. |

EVENING.

| | | |
| --- | --- | --- |
| Green blue med. Pansy. Violet blue deep. Cloissonné. | Jade. Grape fruit. Fleur de lis. Patricia. | Dryad. Cosmos. Springtime. Turquoise. |

The colors which will appear on the two cards in each device for the "Auburn hair" envelope, in the order in which they will appear under their respective headings in the example here disclosed are as follows:

*Auburn hair.*

STREET.

| Vivid complexion. | Average complexion. | Pale complexion. |
|---|---|---|
| Violet blue dark | Marine blue | Almond green. |
| Green blue dark | Violet red dark | New brick. |
| Brick | Green blue medium | Tortoiseshell. |
| Victoria | Gold brown | Green medium. |

SPORTS.

| | | |
|---|---|---|
| Louis Philippe | Emerald green | Jade. |
| Medium violet | Fleur de lis | Blue green medium. |
| Green blue medium | Jade | Lacquer mex. |
| Narcissus | Pansy | Emerald. |

AFTERNOON.

| | | |
|---|---|---|
| Blue gray | Warm gray | Dryad. |
| Dapline | Orchid | Green gray. |
| Lariat | Grape fruit | Toltec. |
| Lt. blue violet | Powder blue | Lt. turquoise. |

EVENING.

| | | |
|---|---|---|
| Blue violet medium | Louis Philippe | Orchid. |
| Cloissonné | Navaho | Fern. |
| Sunflower | Patricia | Turquoise. |
| Violet blue deep | Maroon | Crabapple. |

The colors which will appear on the two cards in each device for the "Gray hair" envelope, in the order in which they will appear under their respective headings in the example here disclosed are as follows:

*Gray hair.*

STREET.

| Vivid complexion. | Average complexion. | Pale complexion. |
|---|---|---|
| Blue gray | Green blue dark | Green gray. |
| Marine blue | Warm gray | Violet red dark. |
| Victoria | Violet blue dk | Brick. |
| Blue violet dark | Maroon | Almond green. |

SPORT.

| | | |
|---|---|---|
| Louis Philippe | Cloissonné | Fern. |
| Green blue med | Chinese red | Orchid. |
| Narcissus | Emerald green | Lacquer mex. |
| Violet blue dp | Patricia | Blue green mex. |

AFTERNOON.

| | | |
|---|---|---|
| Med. violet | Orchid | Pale turquoise. |
| Warm gray | Powder blue | Springtime. |
| Light blue violet | Green medium | Toltec. |
| Lariat | Springtime | Cosmos. |

EVENING.

| | | |
|---|---|---|
| Cloissonné | Dapline | Dryad. |
| Pansy | Fleur de lis | Patricia. |
| Blue violet med | Jade | Crabapple. |
| Sunflower | Crabapple | Turquoise. |

The colors in any column do not in every instance exhaust the possibilities of harmonious colors shown on the slide, for, as stated on the "Brunette" slides "The brunettes of fair complexion may wear the colors shown for the other two types. The brunette of dark or olive complexion will appear best in those colors shown for her individual type." If it happens that identical colors appear on any one slide for different types, these colors are so located in their respective rows on the slides that the same color never appears through openings in the mask at two of the pictured heads at the same time.

The outside of the envelope serves not only as a mask and a protecting device but also provides a space 17 for inserting a statement of the purpose of the device and a legend or card of the store or shop at which it is used. Moreover the upper edge of the openings 3, 10 and 13 may be curved as shown at 18, giving the depicted head and neck a more natural look above the colored areas visible.

The colors given in the example above stated have been selected with regard to the prevailing fashion in colors, and obviously may be changed from time to time to suit the prevailing fashion or to suit the requirements for assistance or guidance in the selection of harmonious colors.

Having thus described certain embodiments of my invention I claim:

1. In a color harmony device, the combination with a mask, of a colored picture on the mask showing a group of colors, and a sheet movable relatively to the mask and variously colored indifferent areas each color harmonizing with the color group shown in the picture while the mask conceals adjacent colors so that the sheet is adapted to selectively display any one of said areas through an opening in the mask adjacent said picture.

2. The combination with an envelope-casing forming a mask and bearing a representation of a figure showing a plurality of tints, of a sheet behind the mask and variously colored in a plurality of areas each color harmonizing with the tints of the representation, said sheet shiftable so as to display one of the colored areas through an opening in the mask adjacent the representation while concealing adjacent areas behind the mask.

3. The combination with an envelope-casing forming a mask and bearing a representation of a human head colored in substantially natural tints, of a sheet behind the mask and variously colored in a plurality of areas each harmonizing with the tints of the head, said sheet shiftable so as to display one of the colored areas through an opening in the mask adjacent the head while concealing another of the areas behind the mask.

4. In a color harmony device, the combination with a mask, of a plurality of representations on the mask showing a plurality of different groups of colors having a common color element, and a sheet movable relatively to the mask carrying a set of variously colored areas for each of the representations on the mask, each area harmonizing with the colors shown on its corresponding representation and adapted to display one area of each set through corresponding openings in the mask adjacent the respective representations while the mask conceals adjacent areas.

5. The combination with an envelope-casing forming a mask and bearing representations of a plurality of figures each showing a plurality of tints, of a sheet behind the mask and bearing a row of variously colored areas for each figure, each area harmonizing with the tints of its corresponding figure, said sheet shiftable so as to display a selected one of the colored areas in each row adjacent its figure while concealing adjacent colored areas of the same row behind the mask.

6. In a color harmony device, the combination with an envelope having an open end and a face forming a mask, of a plurality of representations on the mask showing a plurality of different colors having a common color element, and a sheet contained in the envelope and movable relatively to the mask, carrying a set of variously colored areas for each of the representations on the mask, each area harmonizing with the colors shown on its corresponding representation and adapted to display one area of each set through corresponding openings in the mask adjacent the respective representations while the mask conceals adjacent areas.

7. In a color harmony device, the combination with a mask depicting a human head and hair of a distinctive color type, of a slide behind the mask bearing a plurality of variously colored areas, each area harmonizing with the depicted head and hair and of such a size as to be fairly displayed at an opening in the mask adjacent the depicted head and hair while the mask conceals adjacent areas.

8. The combination with an envelope-casing forming a mask and bearing representations of a plurality of human heads differing in color elements and each colored in substantially natural tints, of a sheet behind the mask and bearing a row of variously colored areas for each head, each area harmonizing with the tints of its corresponding head, said sheet shiftable so as to display a selected one of the colored areas in each row adjacent its head while concealing adjacent colored areas of the same row behind the mask.

9. In a color harmony device, the combination with a mask depicting a plurality of human heads with complexions and hair of a distinctive color type, of a slide behind the mask bearing a row of variously colored areas for each of said heads, each area harmonizing with the complexion and hair of its row and of such a size as to be fairly displayed at an opening in the mask adjacent its respective head while the mask conceals adjacent areas of the row.

10. In a color harmony device, the combination with a mask depicting a plurality of human heads with complexions and hair of distinctive color types, of a slide behind the mask bearing a row of variously colored areas for each of said heads, each area bearing a color in harmony with the color characterizing the respective head and of such a size as to be fairly displayed at an opening in the mask adjacent said head while the mask conceals adjacent areas of the row.

11. In a color harmony device, the combination with an envelope having an open end and a face forming a mask depicting a plurality of human heads with hair of a distinctive color type, of a plurality of slides adapted to be inserted behind said mask each bearing a plurality of rows of variously colored areas, one row for each of said heads, each area of a given row harmonizing with the complexion and hair of its row and of such a size as to be fairly displayed at an opening in the mask adjacent the respective head while the mask conceals adjacent areas of the row.

12. In a color harmony device, the combination with an envelope having an open end and a face forming a mask and depicting a transverse row of human heads with hair of a distinctive color type and different complexions, the middle head representing an average complexion, of a plurality of slides adapted to be inserted behind said mask each bearing a plurality of rows of variously colored areas, one row for each of said heads, each area of a given row harmonizing with the complexion and hair of its row and of such a size as to be fairly displayed at an opening in the mask adjacent the respective head while the mask conceals adjacent areas of the row.

13. In a color harmony device, the combination with an envelope having an open end and a black face forming a mask and depicting a transverse row of human heads with hair of a distinctive color type and different complexions, the middle head representing an average complexion, of a plurality of slides adapted to be inserted behind said mask each bearing a plurality of rows of variously colored areas, one row for each of said heads, each area of a given row harmonizing with the complexion and hair of its row and of such a size as to be fairly displayed at an opening in the mask adjacent the respective head while the mask conceals adjacent areas of the row.

14. In a color harmony device, the combination with an envelope having an open end and a black face forming a mask and depicting a transverse row of human heads with hair of a distinctive color type and different complexions, of a plurality of slides adapted to be inserted behind said mask each bearing a plurality of rows of variously colored areas, one row for each of said heads, each area of a given row harmonizing with the complexion and hair of its row, and of such a size as to be fairly displayed at an opening in the mask adjacent the respective head about as the material of a gown would show upon the neck, and the arrangement of colors on any slide being such that different colors always appear at the respective heads while adjacent colors on each row are concealed by the mask.

15. Means to exhibit color harmony including a plurality of devices each consisting of an envelope forming a mask, and a slide behind the mask, each mask bearing a representation showing a group of colors, and each slide movable relatively to the mask and carrying a plurality of variously colored areas each of which harmonizes with the color group shown in the representation and is adapted to display any one of said areas through an opening in the mask adjacent said representation while adjacent colors on each row are concealed by the mask.

16. Means for exhibiting color harmony including a plurality of devices each consisting of an envelope forming a mask and a slide behind the mask, each mask depicting a plurality of human heads with complexions and hair of distinctive color types so that the devices cover the range of typical heads, each slide bearing a row of variously colored areas for each of said heads, each area bearing a color in harmony with the color characterizing the respective head and of such a size as to be fairly displayed at an opening in the mask adjacent said head while adjacent colors on each row are concealed by the mask.

In testimony whereof, I have affixed my signature to this specification.

HAZEL H. ADLER.